United States Patent
Bolyard, III

(10) Patent No.: US 6,276,233 B1
(45) Date of Patent: Aug. 21, 2001

(54) CONNECTING ROD AND A METHOD FOR MAKING THE SAME

(75) Inventor: John Clinton Bolyard, III, Livonia, MI (US)

(73) Assignee: Ford Global Tech., Inc., Dearborn, MI (US)

( * ) Notice: Subject to any disclaimer, the term of this patent is extended or adjusted under 35 U.S.C. 154(b) by 0 days.

(21) Appl. No.: 09/468,734

(22) Filed: Dec. 21, 1999

(51) Int. Cl.[7] .............................. B21D 53/84; F16C 03/10; F16B 07/04
(52) U.S. Cl. ..................... 74/579 E; 123/197.3; 74/593; 74/579 R; 403/256; 403/344; 403/374.3; 29/888.09
(58) Field of Search ...................... 29/888.09; 123/197.3; 74/593, 579 R, 579 E; 403/256, 344, 338, 373, 374.1, 374.3

(56) References Cited

U.S. PATENT DOCUMENTS

| | | | |
|---|---|---|---|
| 1,409,606 | * | 3/1922 | Stendahl . |
| 1,788,408 | * | 1/1931 | Raybould . |
| 3,818,577 | * | 6/1974 | Bailey et al. . |
| 4,018,132 | * | 4/1977 | Abe . |
| 4,198,879 | * | 4/1980 | Hornak et al. . |
| 4,684,267 | | 8/1987 | Fetouh . |
| 4,688,446 | * | 8/1987 | Ishikawa . |
| 4,917,555 | * | 4/1990 | Taubert . |
| 5,109,605 | | 5/1992 | Hoag et al. . |
| 5,140,869 | | 8/1992 | Mrdjenovich et al. . |
| 5,197,425 | * | 3/1993 | Santi . |
| 5,524,507 | | 6/1996 | Olmr et al. . |
| 5,584,628 | | 12/1996 | Bernoni . |

* cited by examiner

Primary Examiner—S. Thomas Hughes
Assistant Examiner—Eric Compton
(74) Attorney, Agent, or Firm—Ford Global Tech., Inc.

(57) ABSTRACT

A connecting rod 10 having a generally elongated body portion 15 which includes a piston-connecting end portion 12 and a crankshaft-receiving end portion 13. The connecting rod 10 is selectively fractured, thereby separating cap portion 14 from the body 15 and the crankshaft-receiving end portion 13 and forming surfaces 28, 30, 32, and 34. Dissimilar fasteners 24, 26 selectively connect the separated cap portion 14 to the body 15 and substantially ensure that surface pairs 28, 30 and 32, 34 engagingly mate when the connecting rod 10 is operatively reassembled upon the crankshaft.

16 Claims, 2 Drawing Sheets

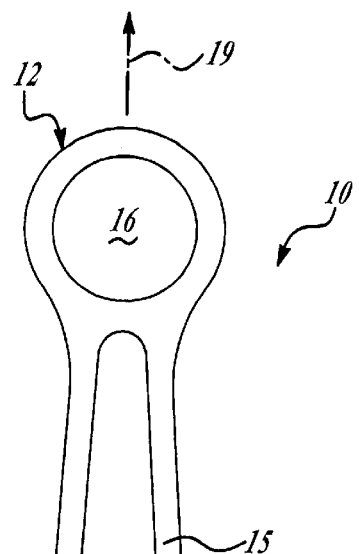
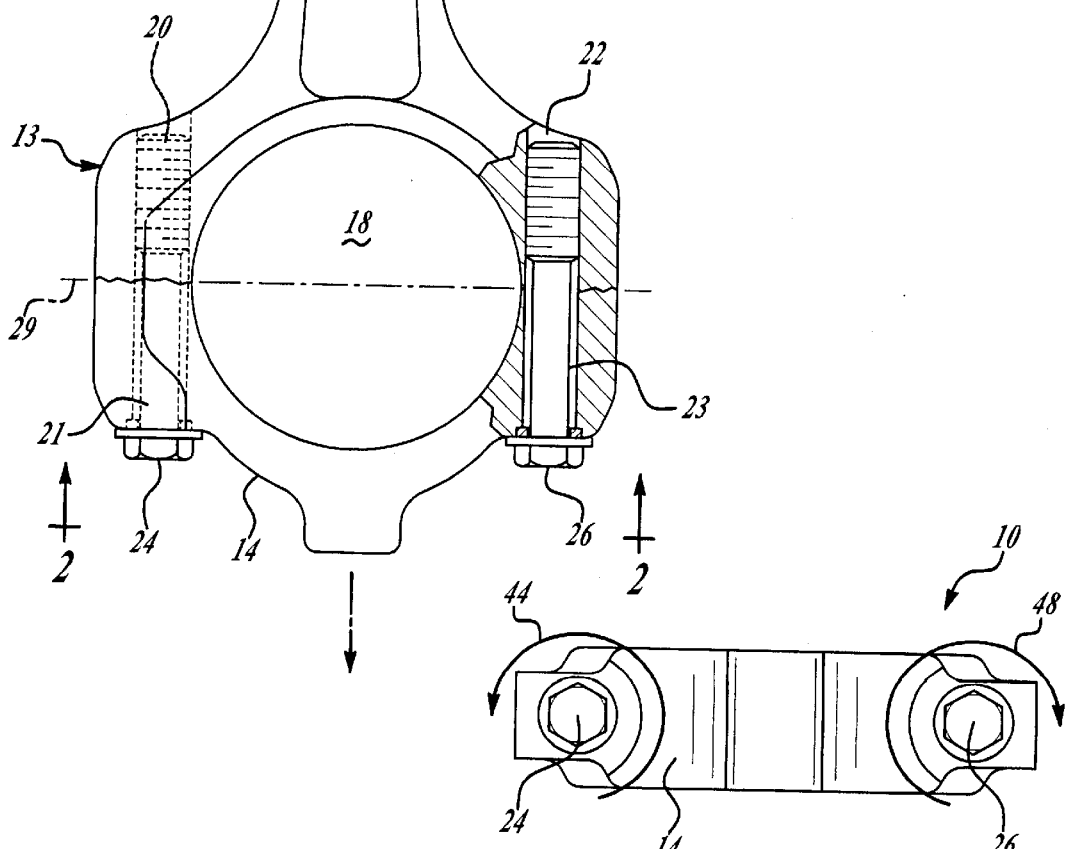
*Figure 1*
*Figure 2*

CONNECTING ROD AND A METHOD FOR MAKING THE SAME

FIELD OF THE INVENTION

The present invention relates to a connecting rod and a method for making a connecting rod having fasteners which are each selectively secured within the connecting rod in a respectively unique manner.

BACKGROUND OF THE INVENTION

Connecting rods are typically used within internal combustion engines and cooperatively and movably connect the pistons of the engine to the crankshaft. Particularly, one end of each connecting rod is operatively coupled and/or connected to a piston, and the opposite end of each of the connecting rods is operatively coupled and/or connected to the crankshaft. That is, each connecting rod typically includes an aperture which operatively receives the crankshaft, thereby coupling the connecting rod to a certain portion of the crankshaft. In this manner, the connecting rods cooperatively and communicatively transfer forces from the pistons to the crankshaft, thereby cooperatively causing the crankshaft to be rotatably moved in response to the movement of the pistons.

In order to facilitate the connection and/or placement of a connecting rod upon the crankshaft, the connecting rod is "pulled apart" and/or is "broken" or "fractured" along the diameter of the crankshaft-receiving aperture, thereby creating a first or "rod" portion and second or "cap" portion which are then easily, individually, and selectively disposed around and/or upon the crankshaft. The rod and cap portions are then selectively and fixedly coupled together or "reassembled" by the use of two substantially identical bolts or fasteners. Particularly, a pair of threaded apertures are formed within the rod portion and a pair of apertures are formed within the cap portion. Each aperture of the cap portion is selectively registered and/or aligned with a unique one of the apertures of the rod portion. A fastener is then inserted into each pair of registered or aligned apertures, thereby selectively securing the cap portion to the rod portion and securely disposing the connecting rod upon the crankshaft.

When a connecting rod is "pulled apart" or "fractured", a pair of mating surfaces are respectively formed upon each of the rod and cap portions. These surfaces each have unique surface contours (e.g., distinct ridges, grooves, and/or other "imperfections"). Moreover, each of the pair of surfaces upon the cap portion are adapted to mate with a unique one of the pair of surfaces of the rod portion. Hence, when the connecting rod is reassembled "upon the crankshaft", it is desirable to ensure that each of the surfaces which are formed upon the rod portion are made to respectively and matingly engage a respective and unique one of the surfaces of the cap portion, thereby allowing the cap and the rod portions to be "realigned" or "reconnected" in substantially the same manner as they were originally integrally connected and/or aligned before the break or fracture occurred.

However, when the connecting rod is re-assembled or installed upon a crankshaft by an operator or user, it is typically and relatively difficult to determine the manner in which the rod portion and the cap portion were originally aligned and/or integrally connected before the fracture or "break" occurred (i.e., to determine the proper and/or desired mating engagement of the respective mating surfaces). Hence, the connecting rod is often installed or assembled upon the crankshaft with the rod portion and cap portion being "misaligned" or "reversed" (i.e., the cap and rod portions are not aligned or connected in substantially the same manner as they were originally integrally connected or aligned before the fracture or "break" occurred).

This misalignment is detrimental to the overall operation of the engine. Particularly, during engine operation, the misalignment of the cap and rod portions and of these respective surface portions typically causes the cap portion to move or "shift" with respect to the rod portion. This movement or "shifting" undesirably causes the connecting rod to fail, thereby undesirably damaging the vehicle's engine.

Attempts have been made to ensure that the rod and cap portions are properly aligned during installation. These attempts include, by way of example and without limitation, the use of substantially identical "dowel pins" or substantially identical "knurled bolts". While these attempts do somewhat prevent such undesired misalignment, they require additional and relatively costly "machining" or processing of the connecting rod, and substantially and undesirably increase the overall time required to manufacture and/or assemble the connecting rod.

There is therefore a need to provide a connecting rod and a method for making a connecting rod which overcomes some or all of the previously delineated drawbacks, which substantially ensures that the cap and rod portions of a connecting rod are properly aligned during assembly and/or installation upon a crankshaft, and which is relatively easy and cost-effective to produce.

SUMMARY OF THE INVENTION

It is a first object of the present invention to provide a connecting rod and a method for making a connecting rod which overcomes some or all of the previously delineated drawbacks of prior connecting rods and prior connecting rod forming methodologies and techniques.

It is a second object of the present invention to provide a connecting rod and a method for making a connecting rod having first and second portions, the method being adapted to substantially ensure that the first and second portions are properly aligned upon a crankshaft.

It is a third object of the present invention to provide a connecting rod which is adapted to be securely, selectively, and operatively fastened to a crankshaft in an efficient and relatively cost-effective manner.

According to a first aspect of the invention, a connecting rod is provided for use in combination with a crankshaft. The connecting rod includes a first member; a second member which cooperates with the first member to form a crankshaft reception aperture; and a pair of fasteners which are each selectively secured to the first and second members in a respectively unique manner.

According to a second aspect of the invention, a connecting rod is provided for use in combination with a piston and a crankshaft. The connecting rod comprises a first portion which is selectively disposed upon the crankshaft and which has a first and a second aperture; a second portion which is selectively disposed upon the crankshaft, which includes a third aperture which is selectively aligned with the first aperture when the second portion is selectively disposed upon the crankshaft, and which further includes a fourth aperture which is selectively aligned with the second aperture when the second portion is selectively disposed upon the crankshaft; a first fastener which is selectively inserted into the aligned first and third apertures and which selectively couples the first portion to the second portion as the first fastener is selectively rotated in a first direction; and a second fastener which is selectively inserted into the aligned second and fourth apertures and which selectively couples the first portion to the second portion as the second fastener is selectively rotated in a second direction, the second direction being opposite to the first direction.

According to a third aspect of the invention, a method for making a connecting rod is provided. The method comprises the steps of forming a member having a first end portion which includes a first aperture and a second end portion having a second aperture; forming a first fastener reception aperture which is adapted to receive a fastener of a first type within the member; forming a second fastener reception aperture which is adapted to receive a fastener of a second type within the member; fracturing the member, effective to separate the second end portion from the member; providing a first fastener of the first fastener type; providing a second fastener of the second fastener type; fastenably inserting the first fastener within the separated second end portion and within the first fastener reception aperture; and fastenably inserting the second fastener within the separated second end portion and within the second fastener reception aperture, the first and second fasteners cooperatively attaching the second end portion to the member.

These and other features, aspects, and advantages of the invention will become apparent by reading the following specifications and by reference to the following drawings.

BRIEF DESCRIPTION OF THE DRAWINGS

FIG. 1 is a front view of a connecting rod which is formed and/or produced in accordance with the teachings of the preferred embodiment of the invention;

FIG. 2 is a bottom view, taken in the direction of view arrow 2, of the connecting rod which is shown in FIG. 1.

DETAILED DESCRIPTION OF THE PREFERRED EMBODIMENT OF THE INVENTION

Figure 3:
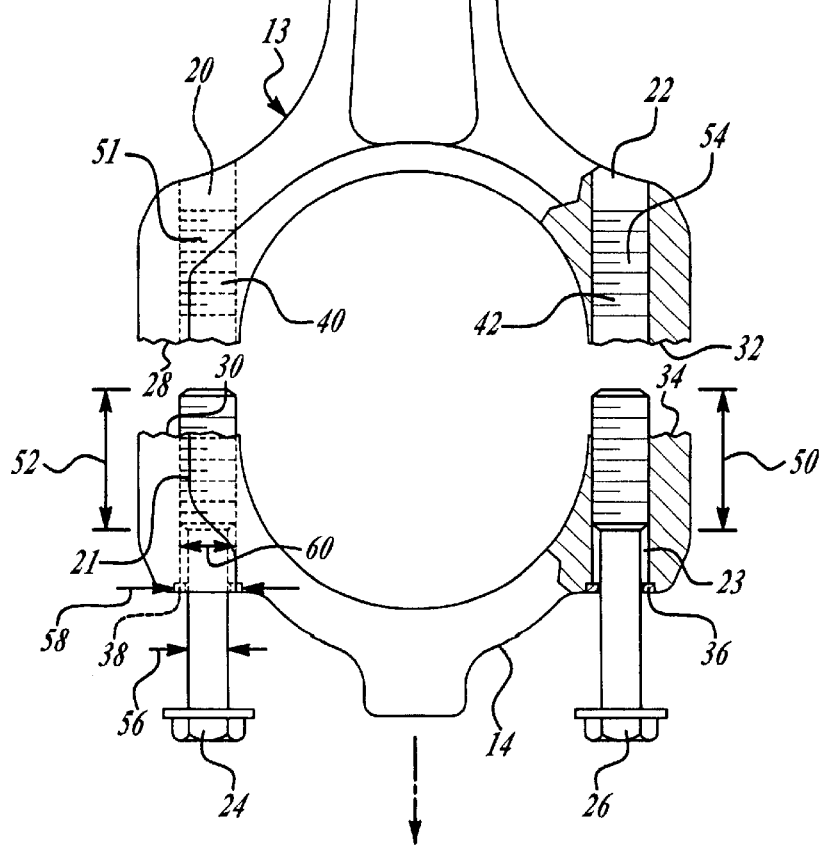
FIG. 3 is a front and disassembled view of the connecting rod which is shown in FIG. 1.

Referring now to FIGS. 1–3, there is shown a connecting rod 10 which is produced and/or formed in accordance with the teachings of the preferred embodiment of the invention. As shown best in FIG. 1, connecting rod 10 includes a generally elongated body 15 which integrally forms and/or integrally terminates within and/or which includes a generally round piston-connecting end portion 12, and a generally round crankshaft-connecting end portion 13. Connecting rod 10 (i.e., body 15 and end portions 12, 13) may be initially and integrally formed by conventional forming processes and/or methodologies.

End portion 13 includes a cap portion 14 which, as is more fully delineated below, is selectively separated from body 15 and portion 13 and is then selectively coupled or "reconnected" to portion or member 13 by the use of a pair of dissimilar fasteners 24, 26.

Piston-connecting end portion 12 includes a generally circular aperture 16 which is adapted to operatively receive and/or to be operatively coupled to a conventional piston and pin assembly (not shown) in a known and conventional manner. Portion 13 forms and/or includes a generally circular aperture 18 which is relatively larger in diameter than aperture 16. More particularly, as is more fully delineated below, aperture 18 is adapted to operatively receive and retain a conventional engine crankshaft (not shown). Hence, apertures 16, 18 cooperatively allow connecting rod 10 to operatively and selectively connect and movably couple a conventional piston to a conventional engine crankshaft.

Integrally formed apertures 20, 22 extend through portions 13, 14 and are substantially parallel to the longitudinal axis of symmetry 19 of the connecting rod 10. In the preferred embodiment of the invention, aperture 20 is bounded by or "contains" a left-handed type of threaded fastener retention or grooved region 40 which is operatively designed and/or adapted to receive a left-handed type of fastener 24 (i.e., fastener 24 has a left-handed grooved or threaded portion or region 52). Aperture 22, in the preferred embodiment of the invention, is bounded by or contains a right-handed type of threaded fastener retention or grooved region 42 which is operatively designed to receive a right-handed type of fastener 26 (i.e., fastener 26 has a right-handed grooved or threaded portion or region 50). Fasteners 24, 26 may, in one non-limiting embodiment, each comprise a threaded bolt.

Cap portion 14 includes a pair of generally circular "ferrules", "rings", or restriction members 38, 36. Particularly, in the preferred embodiment of the invention, restriction portions or members 36, 38 are respectively and conventionally formed and selectively disposed around fasteners 24, 26 before fasteners 24, 26 are insertably and respectively placed within the apertures 20, 22. Particularly, members 38, 36 have an internal or inside diameter 56 which is smaller than the respective diameters of threaded regions 52, 50 of fasteners 24, 26. Members 38, 36 have also an external diameter 58 which is slightly larger than the diameter 60 of the respective apertures 20, 22. Due to this slightly larger diameter 58, ferrules or retention members 38, 36 are conventionally and respectively "press-fitted" into regions 21, 23 of apertures 20, 22 as the fasteners 24, 26 are selectively respectively, and initially inserted into these aperture regions 21, 23. Thereafter, restriction members or ferrules 38, 36 are substantially effective to respectively restrict the opening of aperture 20, 22, while concomitantly allowing fasteners 24, 26 to selectively and slidably move within apertures 20, 22 in a direction which is substantially parallel to the longitudinal axis of symmetry 19. The members 38, 36 also respectively, substantially, and concomitantly prevent fasteners 24, 26 from respectively being removed from apertures 20, 22.

Particularly, once members 38, 36 are press-fitted into apertures 20, 22, in the previously delineated manner, members 38, 36 respectively and operatively retain or "capture" fasteners 24, 26 within the cap portion or member 14, thereby simplifying the assembly or installation process by eliminating the need for a user or installer to handle "loose" fasteners or bolts. In alternate embodiments, other methods, devices, and/or strategies may be used and/or employed to retain the fasteners 24, 26 within the respective apertures 20, 22 of cap portion 14.

After the connecting rod 10 is formed, the connecting rod 10 is "pulled apart", "broken", or "fractured" substantially along axis or line 29, effective to separate portions 13 and 14, as is best shown in FIG. 3, thereby easily allowing the separated portions 13, 14 to be individually and operatively disposed upon a vehicle crankshaft (not shown) and then "reconnected" or "reassembled", effective to "capture" the crankshaft within the cooperatively formed crankshaft reception aperture 18.

As shown best in FIG. 3, such fracturing causes contoured or uneven/rough surfaces or portions 28, 32 to be formed on portion 13 and causes contoured or uneven/rough surfaces or portions 34, 30 to be formed on portion 14. During selective "reassembly", surface portions or areas 28, 32 are adapted to matingly engage surface portions or areas 30, 34.

Once the separated portions 13, 14 are disposed upon the crankshaft, portions 21 and 51 of aperture 20 are aligned and registered while surface or portion 28 engagingly mates with surface or portion 30. Moreover portion 54 of aperture 22 is registered and/or aligned with portion 23 of aperture 22 and surface or portion 32 matingly engages with surface or portion 34.

To "reconnect" or selectively "reassemble" cap 14 to portion 13 and to operatively contain or capture the crankshaft within the aperture 18, fastener 24 must fastenably engage retention portion 40 and be selectively rotated in a "counter-clockwise" or "left-hand" rotation or direction, as indicated by arrow 44. Fastener 26 must fastenably engage retention portion 42 and be selectively rotated in a "clockwise" or "right-hand" direction or rotation, as indicated by arrow 48. It should be appreciated that the "right-hand thread" fastener 26 may not be insertably and operatively used within portion 51 of aperture 20 and the "left-hand thread" fastener 24 may not be insertably and operatively used within portion 54 of aperture 22.

It should therefore be appreciated from the foregoing discussion that the use of "left-hand thread" fastener 24, "right-hand thread" fastener 26, and the respectively adapted dissimilar threaded regions 40, 42, cooperatively prevent a user and/or operator from installing or assembling the connecting rod 10 in an undesired manner (i.e., with surface portions 28 and 34 and surface portions 32 and 30 being matingly engaged). In this manner, before the connecting rod 10 may be operatively connected to a crankshaft, surface 32 must matingly engage surface 34 and surface 28 must matingly engage surface 30, thereby properly "reassembling" the connecting rod 10.

It should be understood that the invention is not limited to the exact embodiment or construction which has been illustrated and described but that various changes may be made without departing from the spirit and the scope of the invention.

What is claimed is:

1. A connecting rod for use in combination with a crankshaft, said connecting rod comprising:
   a first member;
   a second member which cooperates with said first member to selectively form a crankshaft reception aperture; and
   a pair of fasteners comprising a first left-handed threaded bolt and a second right-handed threaded bolt which are each selectively secured within said first and second members in a respectively unique manner.

2. The connecting rod of claim 1 further comprising a pair of restriction members which cooperatively prevent said pair of fasteners from being easily removed from said second member.

3. The connecting rod of claim 2 wherein said pair of restriction members are substantially ring-shaped.

4. The connecting rod of claim 2 wherein said pair of restriction members each comprise a substantially identical ferrule.

5. The connecting rod of claim 2 wherein said pair of restriction members are attached to said second member by press fitting said pair of restriction members into said second member.

6. The connecting rod of claim 2 wherein said first member is selectively connected to a piston.

7. A connecting rod for use with a piston and a crankshaft, said connecting rod comprising:
   a first portion which is selectively disposed upon said crankshaft and which has a first and a second aperture;
   a second portion which is selectively disposed upon said crankshaft, which includes a third aperture which is selectively aligned with said first aperture when said second portion is selectively disposed upon said crankshaft, and which further includes a fourth aperture which is selectively aligned with said second aperture when said second portion is selectively disposed upon said crankshaft;
   a first fastener which is selectively inserted into said aligned first and third apertures and which selectively couples said first portion to said second portion as said first fastener is selectively moved in a first counter-clockwise direction; and
   a second fastener which is selectively inserted into said aligned second and fourth apertures and which selectively couples said first portion to said second portion as said second fastener is selectively moved in a second direction, said second direction being opposite to said first counter-clockwise direction.

8. The connecting rod of claim 7 wherein said first fastener comprises a left-handed threaded fastener.

9. The connecting rod of claim 7 wherein said second fastener comprises a right-handed threaded fastener.

10. The connecting rod of claim 7 wherein said second direction is clockwise.

11. The connecting rod of claim 7 further comprising:
    a first restriction member, said first restriction member being disposed within said third aperture and around said first fastener; and
    a second restriction member, said second restriction member being disposed within said fourth aperture and around said second fastener.

12. A method for making a connecting rod comprising the steps of:
    forming a member having a first end portion which includes a first aperture and a second end portion having a second aperture;
    forming a first fastener reception aperture which is adapted to receive a fastener of a first type, within said member;
    forming a second fastener reception aperture which is adapted to receive a fastener of a second type, within said member;
    fracturing said member, effective to separate said second end portion from said member;
    providing a first fastener of said first fastener type comprising a right-handed threaded bolt;
    providing a second fastener of said second fastener type comprising a left-handed threaded fastener;
    fastenably inserting said first fastener within said separated second end portion and within said first fastener reception aperture; and
    fastenably inserting said second fastener within said separated second end portion and within said second fastener reception aperture, said first and second fasteners cooperatively attaching said second end portion to said member.

13. The method of claim 12 further comprising the steps of:
    providing first and second restriction members;

placing said first restriction member within said first fastener receiving apertures; and placing said second restriction member within said second fastener receiving aperture.

14. The method of claim 12 wherein said second fastener comprises a right-handed threaded bolt.

15. The method of claim 12 wherein said first and second restriction members are ring-shaped.

16. The method of claim 14 wherein said first and second restriction members comprise ferrules.

* * * * *